March 12, 1940.   H. E. HEIGIS   2,193,725
RECOIL PREVENTING SAFETY DEVICE
Filed Feb. 19, 1938
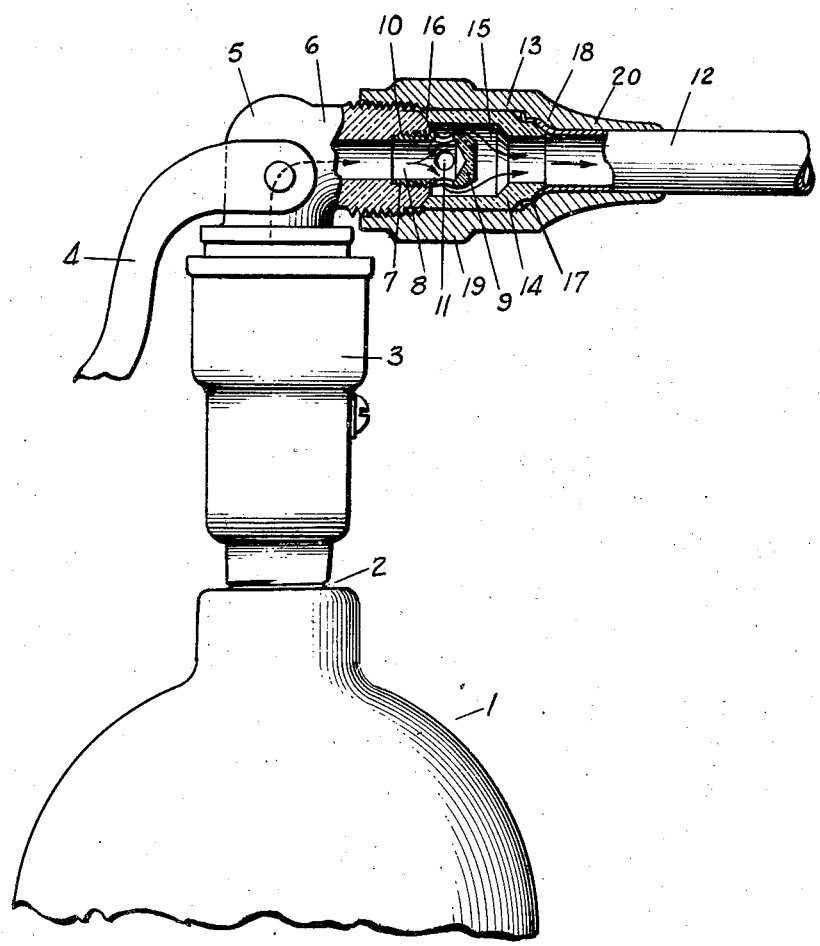
INVENTOR
*Henry E. Heigis*
BY
*J. William Carson*
ATTORNEY Patented Mar. 12, 1940

2,193,725

UNITED STATES PATENT OFFICE 2,193,725

RECOIL PREVENTING SAFETY DEVICE

Henry Ernest Heigis, West Orange, N. J., assignor to Walter Kidde & Company, Inc., Bloomfield, N. J., a corporation of New York Application February 19, 1938, Serial No. 191,361

1 Claim. (Cl. 138—40)

This invention relates to recoil prevention safety devices used in connection with high pressure fluid delivery means where a detachable conduit or hose is required.

In the use of high pressure fluid containers such as are employed with portable fire extinguishing apparatus, it is necessary to insure that the fluid is not permitted to discharge too freely from the container, as the reaction produced by the rapidly discharging high pressure fluid will set the container in motion if it is not secured against movement. As a matter of fact, if the control valve of such a high pressure container is opened, so that the fluid is permitted to escape freely, i. e., not through a conduit, the fluid container if insecure is liable to be impelled with great force with the possibility of injury and damage. In order to prevent such an occurrence, a so-called recoil preventing safety device is set into the outlet of the valve which controls the discharge of fluid from the container, so that should the fluid valve be opened when there is no conduit connection to the container, the fluid will escape in a manner to prevent any serious reaction on the container. Such devices are, of course, only useful when they are permanent with respect to the container outlet, so that the device remains in place when any conduit connected to the container outlet is uncoupled. Although they may or may not be detachable, they are really intended to be unitary with the container outlet; and they therefore call for a conduit or hose connection which will accommodate an outlet provided with such a device.

It is therefore the primary object of the present invention to provide a conduit connection for a high pressure fluid delivery outlet having a recoil preventing safety device which is unitary with the delivery outlet, and which remains in place when the conduit is removed.

Another object of the invention is to provide a fluid outlet arrangement in connection with a recoil preventing safety device which is adapted for quick and convenient coupling and uncoupling of a discharge conduit.

Still another object of the invention is the provision of a quick coupling conduit connection for a high pressure fluid delivery outlet which will accommodate a recoil preventing safety device.

A still further object of this invention is to provide a structure having these advantages which is simple and adapted for rapid and economical manufacture and efficient in use.

This invention resides substantially in the combination, construction, arrangement and relative location of parts, as will become apparent in greater detail hereinafter.

Referring to the drawing, the single figure is a side elevational view of the upper portion of a portable high pressure fluid medium container, the control discharge valve therefor, and the safety device and conduit connection of this invention in cross-section.

The upper end of the high pressure fluid container is shown at 1, to which is secured by threads in the open and threaded neck of the container the usual control valve 3 having a control handle 4 secured to the outlet piece 5 of valve 3. The valve outlet piece 5 is provided with a hollow extension 6 communicating with the interior thereof, into which is secured a safety device 7. This cap is provided with central passage 8 which is closed by the end wall 9. One end of the safety device is externally threaded as at 10 to be secured in the outlet of the control valve 3. The space in the wall of the device between these threads 10 and the end wall is provided with two or more openings 11 which are preferably arranged in pairs diametrically opposite to each other, although any arrangement for producing a balanced discharge of the fluid is satisfactory. The connection between outlet extension 6 and conduit or pipe 12, which may be of any material, is accomplished by coupling 13 and spacer member 14. This member 14 is formed with a chamber 15 to take up the fluid streams issuing from the openings 11 of the safety device, and with a seat at each end as at 16 and 17 to cooperate at one end with a corresponding seat of outlet extension 6 and with another seat formed within coupling 13, all of which combine to cause a clamp-like hold to be exerted on the flared end 18 of pipe 12 by the two seats encompassing it when coupling 13 is turned home. The coupling 13 is provided with a hexagonal nut formation at 19 to facilitate manipulation and is formed with an extended and attenuated end 20 to improve the hold on the pipe or conduit 12.

With the construction above described, it will be seen that the conduit and the coupling may be quickly attached or detached without affecting the safe discharge of the fluid in the least, the recoil preventing safety device remaining in place within the discharge outlet after the conduit has been disconnected and serving to produce a balanced discharge of the fluid without recoil.

It will of course be understood that the invention may be adapted to conduit connections between successive lengths of conduit or pipe, so that wherever a length or lengths of conduit be uncoupled, a recoil preventing safety device will be in position to protect the lengths of conduit still coupled against recoil.

I am, of course, aware that those skilled in the art will readily appreciate other practical forms of devices embodying the principles of construction and operation involved in the form of my invention which I have chosen to describe and illustrate, without departing from the scope of the invention, and I do not, therefore, desire to be strictly limited to the disclosure as given for purposes of illustration but rather to the scope of the appended claim.

I claim:

The combination with high pressure fluid delivery means formed with outlet means having a seating end and external threads, of a recoil preventing safety device secured to the delivery means centrally of the outlet means and protruding therefrom, a tubular spacer having a flaring seat at one end adapted to overlie the seat of said outlet means and a second and converging seat on its other end and forming a chamber to encompass said safety device, fluid conducting means having a flared end adapted to receive the last named seating end of the tubular spacer, and a coupling member having internal threads adapted to cooperate with the external threads of said outlet means and shaped interiorly to conform to the external contour of said spacer and to that of the conducting means, adapted when threaded onto said outlet means to exert a clamping pressure both on the flared end of the conducting means and the spacer member acting substantially along the longitudinal axis of the device.

HENRY ERNEST HEIGIS.